(No Model.)
J. ETTINGER.
ROTARY CUTTER.
No. 529,114.  Patented Nov. 13, 1894.
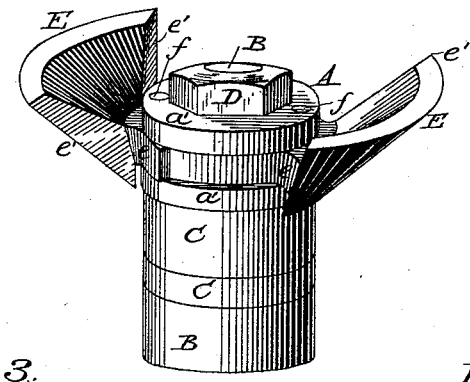
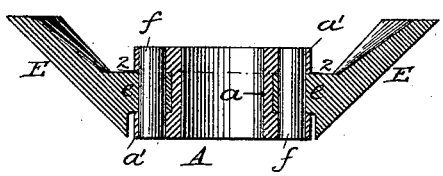
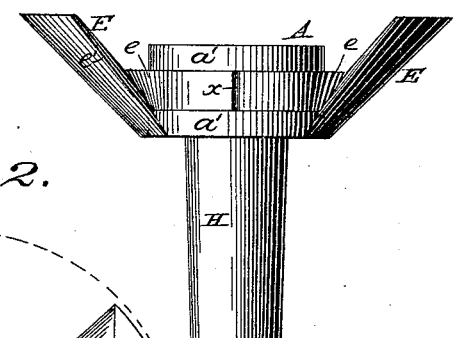
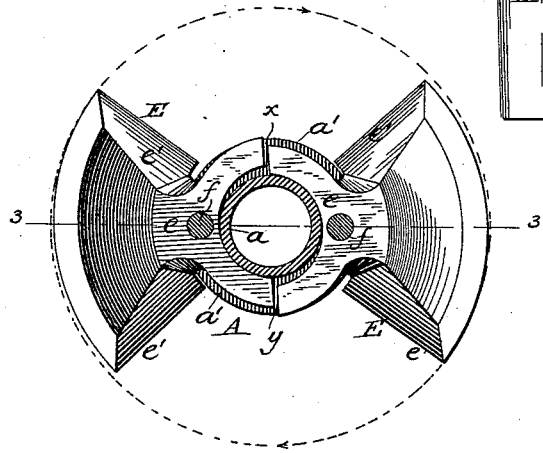
Witnesses:  Inventor.
Sidney P. Hollingsworth  Joel Ettinger,
W. Washington Miller  by his attorneys
  Baldwin Davidson & Wight.

UNITED STATES PATENT OFFICE.

JOEL ETTINGER, OF MILTON, PENNSYLVANIA, ASSIGNOR TO THE JOEL B. ETTINGER MACHINE COMPANY, LIMITED, OF SAME PLACE.

ROTARY CUTTER.

SPECIFICATION forming part of Letters Patent No. 529,114, dated November 13, 1894.

Application filed March 15, 1894. Serial No. 503,789. (No model.)

*To all whom it may concern:*

Be it known that I, JOEL ETTINGER, a citizen of the United States, residing at Milton, in the county of Northumberland and State of Pennsylvania, have invented certain new and useful Improvements in Rotary Cutters, of which the following is a specification.

My invention relates to that class of reversible, rotary cutters in which the bits or cutters are pivotally supported, and have a slight movement on their pivots, to adjust them so that their cutting edges shall be projected forward while their faces in rear of the working edges shall be thrown back out of the way to afford the requisite clearance, and thus prevent binding or undue friction. An example of this class of cutters is shown in the expired patent of Daniel Stanley, No. 125,765, granted April 16, 1872. In that patent, the bits are held between two collars and loose pivot pins enter recesses in the bits, and in the collars, and permit the bits to have a slight pivotal movement. A clamping nut is provided for holding the collars, bits and pivot pins in place.

According to my invention, I provide a support for the cutters having parallel flanges rigidly connected together, and between the flanges I pivot the arms or shanks of the bits or cutters. By this arrangement, the bits, while being held in proper operative position, are not clamped in such manner as to prevent their free movement on their pivots at the proper time, as would be the case in the use of a cutter such as shown in the Stanley patent above mentioned.

The details of construction of my improvements, and the subject-matter claimed are hereinafter designated.

In the accompanying drawings—Figure 1 is a perspective view of a cutter constructed in accordance with my invention, and mounted on a supporting spindle. Fig. 2 is a section on the line 2—2 of Fig. 3. Fig. 3 is a section on the line 3—3 of Fig. 2, and Fig. 4 is a view of a modification.

I prefer to employ a thimble as the support for the bits or cutters.

As shown in Figs. 1, 2, and 3, the thimble A is supported on a spindle B, in any suitable way, and is held firmly in place by collars C, and a nut D, fitting the screw-threaded end of the spindle. The thimble, as shown, is hollow, being formed with a central sleeve $a$, and parallel end flanges $a'$, of a sufficient depth to accommodate the shanks or arms $e$, of the bits or cutters E. Pins F, extend through the flanges $a'$ and through the shanks $e$ of the bits, passing loosely through the latter, so that they may have a free pivotal movement.

The bits may be of any suitable form. As shown, they have inclined, beveled cutting edges $e'$, and extend outwardly in an inclined direction from the shanks, which project into the space between the flanges of the thimble, and are pivoted thereto, as above stated. The inner ends of the shanks are each prolonged into two branches and curved around the thimble, their inner ends coming close together with only narrow spaces $x$ and $y$ between them. By this organization, the bits are held firmly in proper working position, without undue pressure upon the shanks. The cutter may be revolved in either direction, and the bits will quickly and automatically shift to accommodate the changed motion. The adjacent ends of the shanks at $x$ or $y$ coming together limit the adjustment of the cutters and take the strain.

When in operation, the cutting edge of each bit will be projected forward so as to operate upon the stock in the most efficient way, while the outer curved surface $z$ of each cutter will be thrown back correspondingly so as to provide the requisite clearance, this surface of the bit being held away from the stock and not coming in frictional contact therewith.

In Fig. 4, a slight modification is shown. In this instance, instead of employing a hollow sleeve, I provide the support for the cutters with a stem H, adapted to be secured in the socket of any suitable supporting device in the driving mechanism.

My improvements mainly relate to the novel way of mounting the bits or cutters in a pivotal support.

It will be observed that the support of the bits is permanently connected to them; that is to say, when the cutter is removed from a spindle, the sleeve or support is removed with the cutters instead of being separately removed, as is the case in the construction shown in Stanley's patent above mentioned, where the collars are loosely connected with the cutters and are removed separately from the spindle. Not only, therefore, is my improved rotary cutter compact and readily attached to and detached from the driving mechanism, but when in operative position, the cutters are held in the most efficient manner so that they may adjust themselves to the best working position.

I claim as my invention—

1. A rotary cutter comprising one or more bits or cutters having shanks and a support having flanges held in fixed relation to each other, and between which the shanks of the bits project and with which they are pivotally connected.

2. A rotary cutter comprising a thimble provided with fixed, non-adjustable flanges and bits or cutters having shanks projecting between the flanges and pivoted thereto.

In testimony whereof I have hereunto subscribed my name.

JOEL ETTINGER.

Witnesses:
 JOS. ANGSTADT,
 WM. C. MILLER.